United States Patent
Liu et al.

(10) Patent No.: US 11,842,439 B2
(45) Date of Patent: Dec. 12, 2023

(54) METHOD AND SYSTEM FOR 3D RECONSTRUCTION OF CORONARY ARTERY BASED ON VASCULAR BRANCH REGISTRATION

(71) Applicant: SHANDONG UNIVERSITY, Shandong (CN)

(72) Inventors: Zhi Liu, Jinan (CN); Yankun Cao, Jinan (CN)

(73) Assignee: SHANDONG UNIVERSITY, Shandong (CN)

(*) Notice: Subject to any disclaimer, the term of this patent is extended or adjusted under 35 U.S.C. 154(b) by 0 days.

(21) Appl. No.: 17/911,292

(22) PCT Filed: Dec. 14, 2021

(86) PCT No.: PCT/CN2021/137892
§ 371 (c)(1),
(2) Date: Sep. 13, 2022

(87) PCT Pub. No.: WO2022/127783
PCT Pub. Date: Jun. 23, 2022

(65) Prior Publication Data
US 2023/0128130 A1    Apr. 27, 2023

(30) Foreign Application Priority Data
Dec. 15, 2020 (CN) .......................... 202011480218.3

(51) Int. Cl.
*G06T 17/00* (2006.01)
*G06T 7/11* (2017.01)
(Continued)

(52) U.S. Cl.
CPC ............ *G06T 17/00* (2013.01); *G06T 5/50* (2013.01); *G06T 7/11* (2017.01); *G06T 7/33* (2017.01);
(Continued)

(58) Field of Classification Search
None
See application file for complete search history.

(56) References Cited

U.S. PATENT DOCUMENTS

| 2008/0004530 A1* | 1/2008 | Feldman | A61B 8/5238 |
| | | | 600/467 |
| 2012/0059253 A1 | 3/2012 | Wang et al. | |

(Continued)

FOREIGN PATENT DOCUMENTS

| CN | 103284760 A | 9/2013 |
| CN | 107392994 A | 11/2017 |

(Continued)

OTHER PUBLICATIONS

Moosavi Tayebi R, Wirza R, Sulaiman PS, Dimon MZ, Khalid F, Al-Surmi A, Mazaheri S, "3D multimodal cardiac data reconstruction using angiography and computerized tomographic angiography registration" J Cardiothorac Surg, Apr. 22, 2015;10:58. doi: 10.1186/s13019-015-0249-2. PMID:25896185;PMCID:PMC4430913 (Year: 2015).*

(Continued)

*Primary Examiner* — James A Thompson
(74) *Attorney, Agent, or Firm* — Oliff PLC

(57) ABSTRACT

A method and system for 3D reconstruction of coronary artery based on vascular branch registration. The method includes: classifying bifurcated vessels and normal vessels of an intravascular ultrasound image and segmenting intima and adventitia of the bifurcated vessels and normal vessels separately; extracting a 3D centerline of a CAG image; locating vascular branches and automatically matching key points of the CAG image; and registering the intima and adventitia segmentation images to the 3D centerline of the CAG image according to the key points of the CAG image and performing 3D reconstruction of the coronary artery. The method uses automatic matching of vascular branches (Continued)

to fuse CAG and IVUS images and reconstruct them in 3D, which is more helpful for intuitive judgment of doctors on the premise of improving speed and accuracy, and is of great significance for auxiliary diagnosis of diseases.

6 Claims, 2 Drawing Sheets

(51) Int. Cl.
*G06T 7/66* (2017.01)
*G06T 7/33* (2017.01)
*G06T 5/50* (2006.01)
*G06V 10/764* (2022.01)

(52) U.S. Cl.
CPC .............. *G06T 7/66* (2017.01); *G06V 10/764* (2022.01); *G06T 2207/10132* (2013.01); *G06T 2207/20221* (2013.01); *G06T 2207/30101* (2013.01)

(56) References Cited

U.S. PATENT DOCUMENTS

| | | | | |
|---|---|---|---|---|
| 2015/0339847 | A1* | 11/2015 | Benishti | A61B 5/026 382/131 |
| 2017/0258433 | A1* | 9/2017 | Gulsun | A61B 6/5217 |
| 2020/0118264 | A1* | 4/2020 | Harish | A61B 6/504 |
| 2021/0298708 | A1* | 9/2021 | Aben | A61B 6/5247 |
| 2022/0114388 | A1* | 4/2022 | Li | G06T 7/11 |

FOREIGN PATENT DOCUMENTS

| | | |
|---|---|---|
| CN | 111063018 A | 4/2020 |
| CN | 112652052 A | 4/2021 |

OTHER PUBLICATIONS

X. Wang, C. Peng, X. Liu and Z. Pan, "Functional Assessment of Stenotic Coronary Artery in 3D Geometric Reconstruction From Fusion of Intravascular Ultrasound and X-Ray Angiography," in IEEE Access, vol. 6, pp. 53330-53341, 2018, doi: 10.1109/ACCESS. 2018.2870950 (Year: 2018).*

Wang, Huanli; Three-dimensional Reconstruction Study and Implementation Based on Intravascular Ultrasound Imaging; Dissertation for Master Degree in Engineering, Harbin Institute of Technology; Chinese Master's Theses Full-text Database, Information Science; 2013; 58pp.

Wang Ling et al.; "Reconstruction Method for Vascular Model Based on CAG and IVUS Images;" Journal of Computer-Aided Design & Computer Graphics; 2016; pp. 1506-1511; vol. 28, No. 9.

Huang et al.; "3D Reconstruction of Coronary Arterial Tree Skeleton From Two Biplane X-Ray Angiograms;" Chinese Journal of Biomedical Engineering; 2004; pp. 109-115; vol. 23, No. 2.

Apr. 26, 2022 Office Action issued in Chinese Patent Application No. 202011480218.3.

Mar. 1, 2022 Search Report issued in International Patent Application No. PCT/CN2021/137892.

Mar. 1, 2022 Written Opinion of the International Searching Authority issued in International Patent Application No. PCT/CN2021/137892.

\* cited by examiner

METHOD AND SYSTEM FOR 3D RECONSTRUCTION OF CORONARY ARTERY BASED ON VASCULAR BRANCH REGISTRATION

CROSS-REFERENCES TO RELATED APPLICATIONS

This application claims priority benefits to Chinese Patent Application No. 202011480218.3, filed 15 Dec. 2020, the contents of which are incorporated herein by reference.

TECHNICAL FIELD

The present invention belongs to the field of three-dimensional (3D) modeling, and particularly relates to a method and system for 3D reconstruction of coronary artery based on vascular branch registration.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

Coronary atherosclerotic heart disease (CAD) is a major disease that seriously endangers the human health. Currently, the coronary angiography (CAG) and intravascular ultrasound (IVUS) are the most common modalities used to diagnose and treat CAD if the patient is diagnosed with CAD. Wherein, CAG, the current "gold standard" for CAD diagnosis, can clarify the presence of coronary artery stenosis, the location and degree of stenosis, etc., while IVUS which uses cardiac catheters to introduce an ultrasonic probe into the vascular lumen for detection to obtain micro-anatomical information such as the lumen area, wall thickness, and plaque of the vessel. However, CAG does not provide information on the structure of the vessel wall and the extent of lesion. Due to the limitations of current catheter technology, IVUS ultrasound catheter are not yet able to pass smoothly through the site of severe lesions, and the spatial location of the coronary artery where the lesions are located cannot be obtained by IVUS. Combining the information from CAG and IVUS and combining the advantages of both imaging modalities will greatly improve the efficiency of diagnosis and treatment of CAD. A 3D vascular reconstruction based on CAG and IVUS can accurately evaluate and diagnose the tissue characterization of various cardiovascular diseases, so as to obtain the best treatment choice. This 3D reconstruction method allows monitoring and studying the dynamic development and progression of atherosclerotic plaque, thus minimizing or omitting the use of angiography during clinical treatment in navigation and surgery and reducing the operation time and the use of contrast agents.

The current IVUS image 3D reconstruction methods only depend on IVUS information and do not fuse CAG information, so the spatial position of the coronary artery where the lesion is located cannot be obtained; in addition, although some coronary artery 3D reconstruction methods fuse CAG and IVUS for 3D reconstruction, but the fusion does not refer to the vessel branch information, and the starting point needs to be manually determined. The inventor found that, in clinical practice, IVUS is often performed on patients first and then CAG, or CAG is performed first and then IVUS is performed, which will lead to the inability to determine whether the reference point of IVUS is consistent with that of CAG, causing great difficulties in registration between the two.

SUMMARY

For solving at least one technical problem existing in the background, the present invention provides a method and system for 3D reconstruction of coronary artery based on vascular branch registration, which uses automatic matching of vascular branches to fuse CAG and IVUS images and reconstruct them in 3D, which is more helpful for intuitive judgment of doctors on the premise of improving speed and accuracy, and is of great significance for auxiliary diagnosis of diseases.

For achieving the above purpose, the present invention uses the following technical solutions.

A first aspect of the present invention is to provide a method for 3D reconstruction of coronary arteries based on vascular branch registration, comprising:
    classifying bifurcated vessels and normal vessels of an IVUS image and segmenting intima and adventitias of the bifurcated vessels and normal vessels separately to obtain intima and adventitia segmentation images; extracting a 3D centerline of a CAG image;
    locating vascular branches and automatically matching key points of the CAG image; and
    registering the intima and adventitia segmentation images to the 3D centerline of the CAG image according to the key points of the CAG image and performing 3D reconstruction of the coronary artery.

A second aspect of the present invention is to provide a system for 3D reconstruction of coronary arteries based on vascular branch registration, comprising:
    an image processing module, being used to classify bifurcated vessels and normal vessels of IVUS images and segment intima and adventitias of the bifurcated vessels and normal vessels separately, and extract a 3D centerline of a CAG image;
    a key point automatic registration module, being used to locate vascular branches and automatically matching key points of the CAG image; and
    a 3D reconstruction module, being used to register the intima and adventitia segmentation images to the 3D centerline of the CAG image according to the key points of the CAG image and perform 3D reconstruction of the coronary artery.

A third aspect of the present invention is to provide a computer readable storage medium.

The computer readable storage medium, having a computer program stored thereon, when the computer program is executed by a processor, implementing the steps of the method for 3D reconstruction of coronary arteries based on vascular branch registration as described above.

A fourth aspect of the present invention is to provide a computer device.

The computer device, comprising a memory, a processor and a computer program stored in the memory and runnable on the processor, when the processor executing the program, implementing the steps of the method for 3D reconstruction of coronary arteries based on vascular branch registration as described above.

Compared to the prior art, the beneficial effect of the present invention is that Firstly, classifying bifurcation vessels and normal vessels of the IVUS image, and then segmenting the vessels respectively, extracting a centerline of the CAG image, registering the IVUS images with the centerline of the CAG image according to a obtained branching condition of vessels, and automatic matching of vascular branches to fuse CAG and IVUS images and reconstruct them in 3D, which is more helpful for intuitive judgment of doctors on the premise of improving speed and accuracy, and is of great significance for auxiliary diagnosis of diseases.

Advantages of additional aspects of the present invention will be given in the following description, or may become apparent from the following description, or may be learned from the practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations and are not intended to limit exemplary implementations of the present disclosure. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

Example 1

Figure 1:
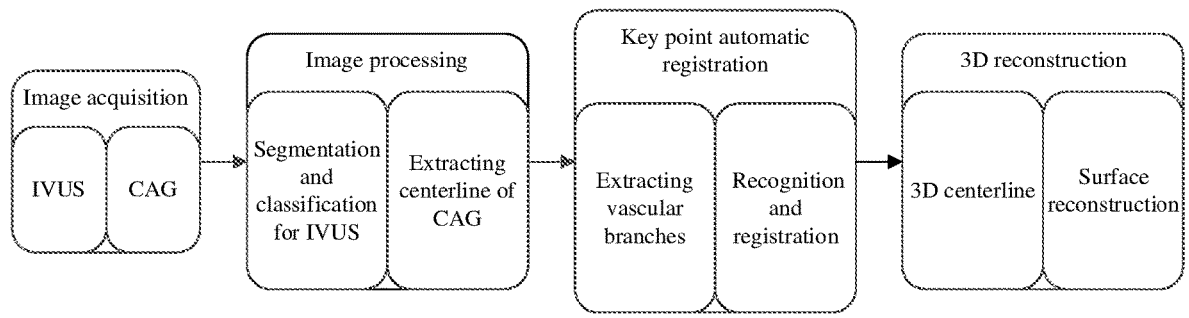
FIG. 1 is a flowchart of a method for 3D reconstruction of coronary arteries based on vascular branch registration of embodiments of the present invention.

Referring to FIG. 1, the example provides a method for 3D reconstruction of coronary arteries based on vascular branch registration, the method comprises:

S101: classifying bifurcated vessels and normal vessels of an IVUS image and segmenting intima and adventitias of the bifurcated vessels and normal vessels separately to obtain intima and adventitia segmentation images; extracting a 3D centerline of a CAG image.

According to a specific implementation, after acquire the IVUS image and the CAG image, performing corresponding processing respectively on the IVUS image and the CAG image.

In the present example, classifying bifurcated vessels and normal vessels of the IVUS image and segmenting intima and adventitias of the bifurcated vessels and normal vessels are performed by a multi-task depth network.

Figure 2:
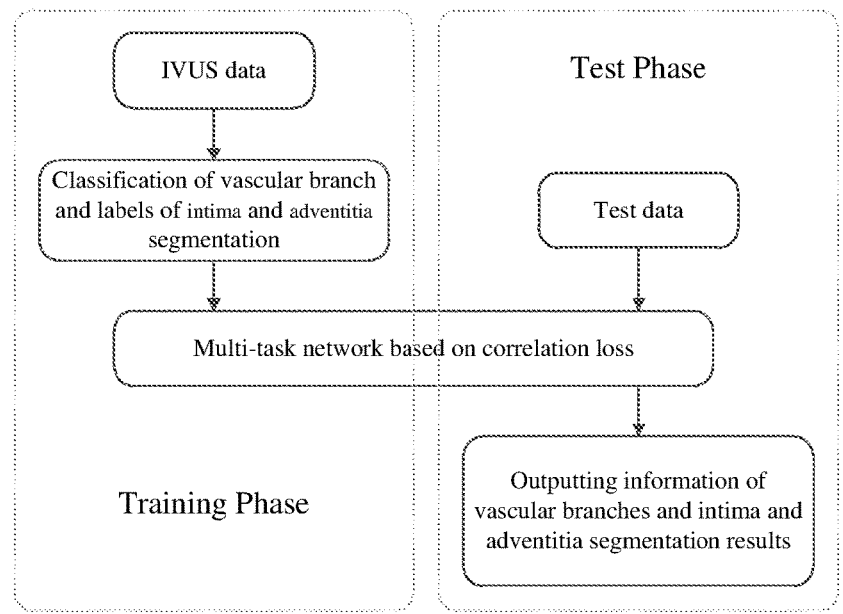
FIG. 2 is a frame diagram of IVUS classification and segmentation based on a multi-task network of embodiments of the present invention.

As shown in FIG. 2, the example mainly has two functions, one is to classify the bifurcated vessel and the normal vessel in the IVUS image, and output the number of frames in which the branch vessels are located and a total number of continuous frames; the other is to segment the inner and outer membranes of the branch vessel and normal vessels, and output the segmentation results. In addition, the two functions are constrained to each other to improve the accuracy of classification and segmentation.

In the specific implementation, when extracting the 3D centerline of the CAG image, a 2D centerline of the CAG image is extracted first, and then the 3D centerline is extracted according to two CAG planes.

It should be noted that the method for extracting the 2D centerline of the CAG image comprises but is not limited to a tracking-based method or a dynamic programming method.

Specifically, the extracting the 3D centerline based on the two imaging planes, comprising but not limited to various coordinate changes using spatial geometric relationships to obtain the 3D centerline.

S102: locating a vessel branch and automatically matching a key point of the CAG image.

In this step, the step of the automatic matching of the key point comprises two parts: branch information extraction and identification matching.

Figure 3:
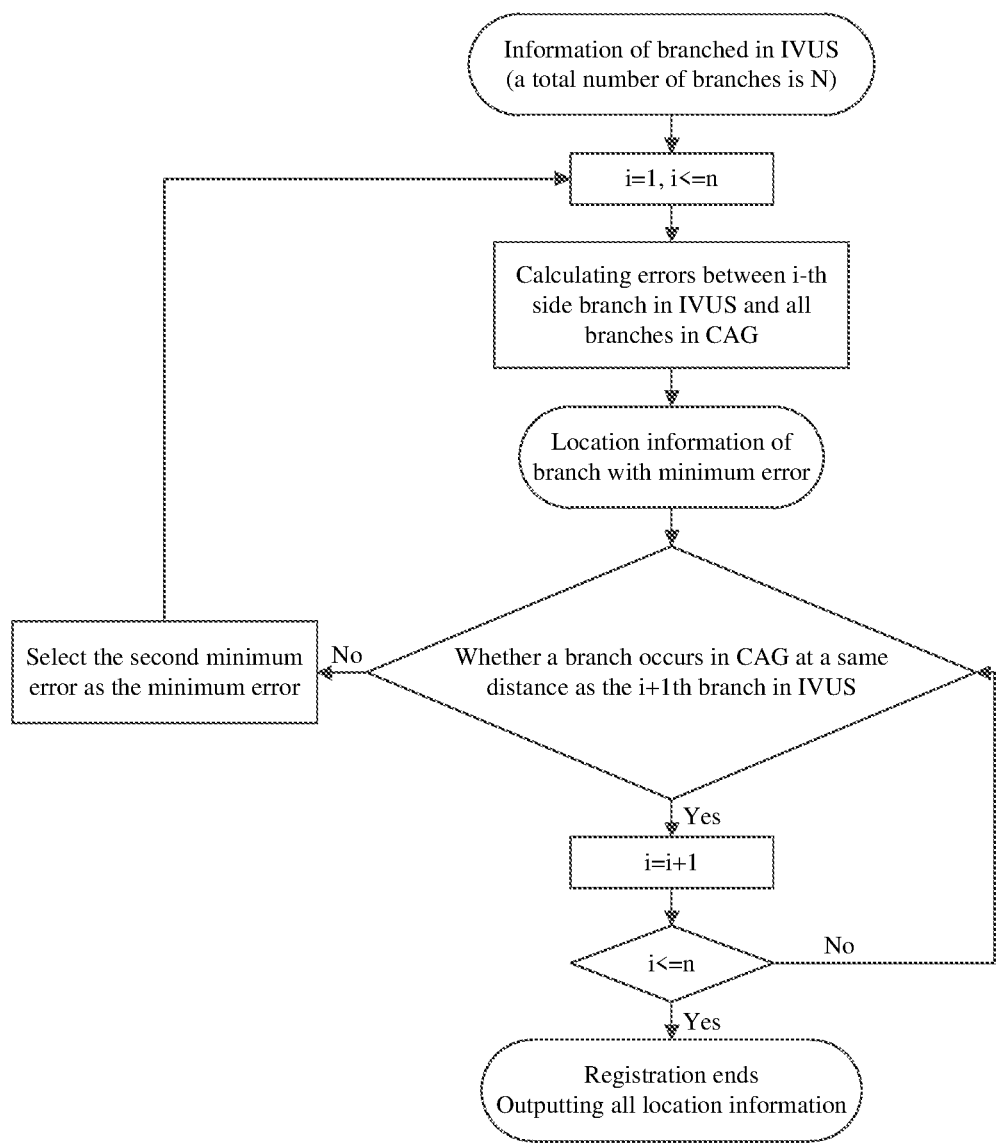
FIG. 3 is a flowchart of a method for automatic registration of key points of embodiments of the present invention.

Specifically, when registering the intima and adventitia segmentation images to the 3D centerline of the CAG image, the length information of the first branch is compared with the length of each branch in the CAG image according to the branch information obtained by classifying bifurcated vessels and normal vessels of the IVUS image and segmenting intima and adventitia of the bifurcated vessels and normal vessels separately. When reaches the maximum matching rate, a match exists, finding the next branch of the coronary angiography image according to the distance between the first branch and the second branch of the intravascular ultrasound image and determine whether there is a match, if there is a match, continue to find the third branch and the fourth branch of the intravascular ultrasound image and confirm whether there is a match, if there is no match, then go back to the previous step to find a branch that can be matched in the coronary angiography image, and so on, until all the branches of the intravascular ultrasound image match with all the branches of the coronary angiography image, thereby achieving automatic registration of key points, as shown in FIG. 3.

Wherein, the matching rate is inversely proportional to an error of the length, that is, the smaller the error between the information of the length of the vascular branches in the IVUS image and the length of the vascular branches in the CAG image, the larger the matching rate. The matching rate is maximized when the information of the length of the vascular branches in the IVUS images is equal to the length of the side branch in the CAG images.

The information of the length of the vascular branch mainly comprises the number of the start frame of the side branch and a sum of consecutive frames. A frame rate and retraction rate of IVUS are known, accordingly, a diameter size of an opening of the side branch $IVUS_l$ can be calculated, and a calculation formula is shown as follows:

$$IVUS_l = \frac{\text{total frames of } IVUS}{\text{frame rate of } IVUS} \times \text{retraction rate of } IVUS \quad (1)$$

S103: registering intima and adventitia segmentation images to the 3D centerline of the coronary angiogram according to the key point of the coronary angiogram image and performing 3D reconstruction of the coronary artery.

Specifically, when performing the 3D reconstruction of the coronary artery, positioning and orientation analysis is performed according to the 3D centerline of the CAG image and the sequence of segmented intravascular ultrasound images, thereby completing fusion of the CAG image and the IVUS image to obtain a coronary artery vascular model.

Wherein, the step of the 3D reconstruction comprises a 3D centerline reconstruction and a surface reconstruction. The 3D centerline reconstruction comprises, but is not limited to, being performed by using a biplane fluoroscopy principle combined with polar constraints. The surface reconstruction comprises, but is not limited to, performing an orientation of the IVUS using a Frenet-Serret frame and then a surface fitting.

It can be understood that the algorithm for obtaining the coronary artery vessel model by fusion comprises but is not limited to methods such as the surface reconstruction and the volume reconstruction and VTK.

In the present embodiment, firstly, classifying bifurcation vessels and normal vessels of the IVUS image, and then segmenting the vessels respectively, extracting a centerline of the CAG image, registering the IVUS images with the centerline of the CAG image according to a obtained branching condition of vessels, and automatic matching of vascular branches to fuse CAG and IVUS images and reconstruct them in 3D, which is more helpful for intuitive judgment of doctors on the premise of improving speed and accuracy, and is of great significance for auxiliary diagnosis of diseases.

Example 2

Referring to FIG. 1, the example provides a system for 3D reconstruction of coronary artery based on vascular branch registration, comprising:
- an image processing module, being used to classify bifurcated vessels and normal vessels of IVUS images and segment intima and adventitias of the bifurcated vessels and normal vessels separately; and extract a 3D centerline of a CAG image;
- a key point automatic registration module, being used to locate vascular branches and automatically matching key points of the CAG image; and
- a 3D reconstruction module, being used to register the intima and adventitia segmentation images to the 3D centerline of the CAG image according to the key points of the CAG image and perform 3D reconstruction of the coronary artery.

The implementation process of each module in the system for 3D reconstruction of coronary artery based on vascular branch registration of this example corresponds to each step in the method for 3D reconstruction of coronary artery based on vascular branch registration of example 1 one by one, and the specific implementation process thereof are the same, which is not described here repeatedly.

In the specific implementation, both the IVUS images and the CAG images are acquired using an image acquisition module 1. Wherein, the image acquisition module comprises an IVUS image acquisition module and a CAG image acquisition module, wherein the IVUS image acquisition module is used to acquire IVUS image information, and the CAG image acquisition module is used to acquire CAG image information. Wherein, the IVUS image is the intravascular ultrasound image; and the CAG image is the coronary angiography image.

Example 3

The example provides a computer readable storage medium having a computer program stored thereon; when the program is executed by a processor, implements steps in a method for 3D reconstruction of coronary artery based on vascular branch registration as described in example 1 above.

Example 4

The example provides a computer device comprising a memory, a processor and a computer program stored on the memory and runnable on the processor; when the processor executing the program, implements steps in a method for 3D reconstruction of coronary artery based on vascular branch registration as described in example 1 above.

Those skilled in the art will appreciate that the embodiments of the present invention may be provided as methods, systems, or computer program products. Therefore, the present invention may take the form of a hardware embodiment, a software embodiment, or an embodiment combining software and hardware aspects. Moreover, the present invention may take the form of a computer program product implemented on one or more computer-usable storage media (including but not limited to, a disk memory, an optical memory, etc.) containing computer-usable program codes therein.

The present invention is described with reference to flow charts and/or block diagrams of methods, devices (systems), and computer program products according to embodiments of the present invention. It should be understood that each process and/or block in a flowchart and/or block diagram, and a combination of processes and/or blocks in a flowchart and/or block diagram, may be implemented by computer program instructions. These computer program instructions may be provided to a processor of a general-purpose computer, a special-purpose computer, an embedded processor, or other programmable data processing device to generate a machine such that instructions executed by a processor of a computer or other programmable data processing device generate means for implementing the functions specified in one or more processes of the flowchart and/or one or more blocks of the block diagram.

These computer program instructions may also be stored in a computer-readable memory that can guide a computer or other programmable data processing device to operate in a specific manner, so that the instructions stored in the computer-readable memory generate a manufactured article including an instruction device that implements the functions specified in one or more flows of the flowchart and/or one or more blocks of the block diagram.

These computer program instructions may also be loaded onto a computer or other programmable data processing device such that a series of operating steps are performed on the computer or other programmable device to produce computer implemented processing, so that the instructions executed on the computer or other programmable device provide steps for implementing the functions specified in one or more processes of the flowchart and/or one or more blocks of the block diagram.

Those skilled in the art can understand that the implementation of all or part of the processes in the methods of the above embodiments can be completed by instructing the relevant hardware through a computer program. The program can be stored in a computer-readable storage medium. When the program is executed, it can include the processes of the embodiments of the above methods. The storage medium can be a magnetic disc, an optical disc, a Read-Only Memory (ROM) or a Random Access Memory (RAM), etc.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A method for 3D reconstruction of coronary arteries based on vascular branch registration, comprising:

classifying bifurcated vessels and normal vessels of an intravascular ultrasound image and segmenting intima and adventitias of the bifurcated vessels and normal vessels separately to obtain intima and adventitia segmentation images;

extracting a 3D centerline of a coronary angiography image;

locating vascular branches and automatically matching key points of the coronary angiography image;

when registering the intima and adventitia segmentation images to the 3D centerline of the coronary angiography image, length information of a first branch is compared with the length of each branch in the coronary arteriogram image according to the branch information obtained by classifying bifurcated vessels and normal vessels of the intravascular ultrasound image and segmenting intima and adventitias of the bifurcated vessels and normal vessels separately;

when the length of the first branch of the intravascular ultrasound image is equal to the length of a first branch in the coronary angiography image or reaches the maximum matching rate, a match exists, finding the next branch of the coronary angiography image according to the distance between the first branch and a second branch of the intravascular ultrasound image and determine whether there is a match, if there is a match, continue to find a next branch of the intravascular ultrasound image and confirm whether there is a match, if there is no match, then use a branch in the coronary angiography image that has the next maximum matching rate with the first branch in the intravascular ultrasound image as the first branch in the coronary angiography image and repeat the step of finding the next branch of the coronary angiography image according to the distance between the first branch and a second branch of the intravascular ultrasound image and determine whether there is a match, and when there is a match, continuing until all the branches of the intravascular ultrasound image match with all the branches of the coronary angiography image, thereby achieving automatic registration of key points; and registering the intima and adventitia segmentation images to the 3D centerline of the coronary angiography image according to the key points of the coronary angiography image and performing 3D reconstruction of the coronary artery.

2. The method as claimed in claim 1, wherein classifying bifurcated vessels and normal vessels of the intravascular ultrasound image and segmenting intima and adventitias of the bifurcated vessels and normal vessels are performed by a multi-task depth network.

3. The method as claimed in claim 1, wherein when extracting the 3D centerline of the coronary angiography image, firstly extracting a 2D centerline of the coronary angiography image, and then extracting the 3D centerline according to two coronary angiography planes.

4. The method as claimed in claim 3, wherein, extracting the 2D centerline of the coronary angiography image is performed by a tracking-based method or a dynamic programming method.

5. The method as claimed in claim 1, wherein, when performing the 3D reconstruction of the coronary artery, positioning and orientation analysis is performed according to the 3D centerline of the coronary angiography image and the sequence of segmented intravascular ultrasound images, thereby completing fusion of the coronary angiography image and the intravascular ultrasound image to obtain a coronary artery vascular model.

6. A computer device, comprising a memory, a processor and a computer program stored on the memory and runnable on the processor, wherein, when the processor executing the program, implementing steps in a method for 3D reconstruction of coronary artery based on vascular branch registration as claimed in claim 1.

* * * * *